49-23

Dec. 5, 1950 A. D. CARANI Re. 23,301

WINDOW STRUCTURE Orig. 2479,602

Original Filed July 30, 1948 4 Sheets-Sheet 1

Attilio D. Carani
INVENTOR.

BY Clarence A. O'Brien and Harvey B. Jacobson
Attorneys

SEARCH ROOM

Dec. 5, 1950 A. D. CARANI Re. 23,301

WINDOW STRUCTURE

Original Filed July 30, 1948 4 Sheets-Sheet 2

Attilio D. Carani
INVENTOR.

BY Clarence A. O'Brien and Harvey B. Jackson
Attorneys

SEARCH ROOM
Dec. 5, 1950 A. D. CARANI Re. 23,301
WINDOW STRUCTURE
Original Filed July 30, 1948 4 Sheets-Sheet 3
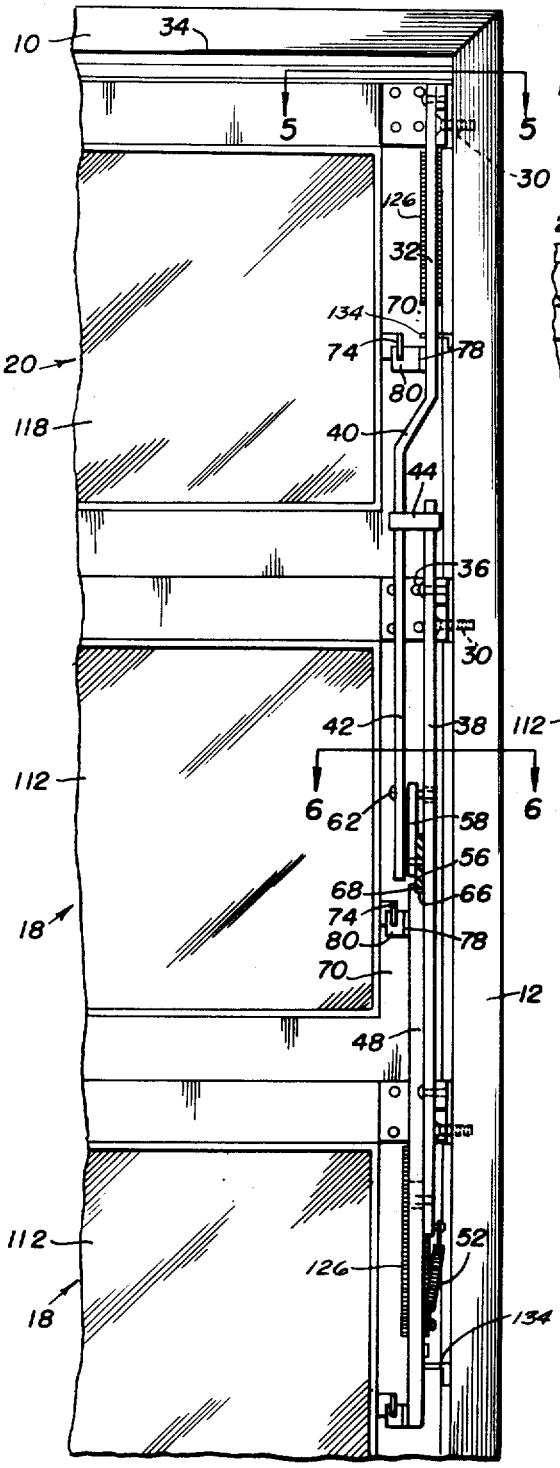
Fig. 4.
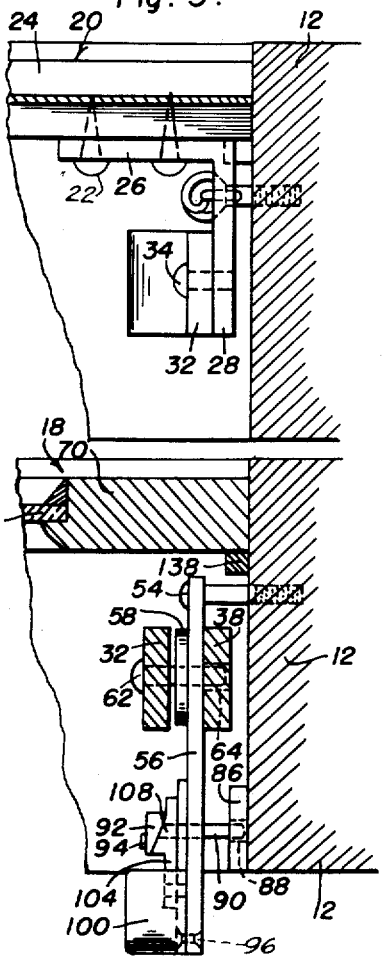
Fig. 5.
Fig. 6.
Attilio D. Carani
INVENTOR.
BY Clarence A. O'Brien and Harvey B. Jacobson
Attorneys SEARCH ROOM
Dec. 5, 1950 A. D. CARANI Re. 23,301
WINDOW STRUCTURE
Original Filed July 30, 1948 4 Sheets-Sheet 4
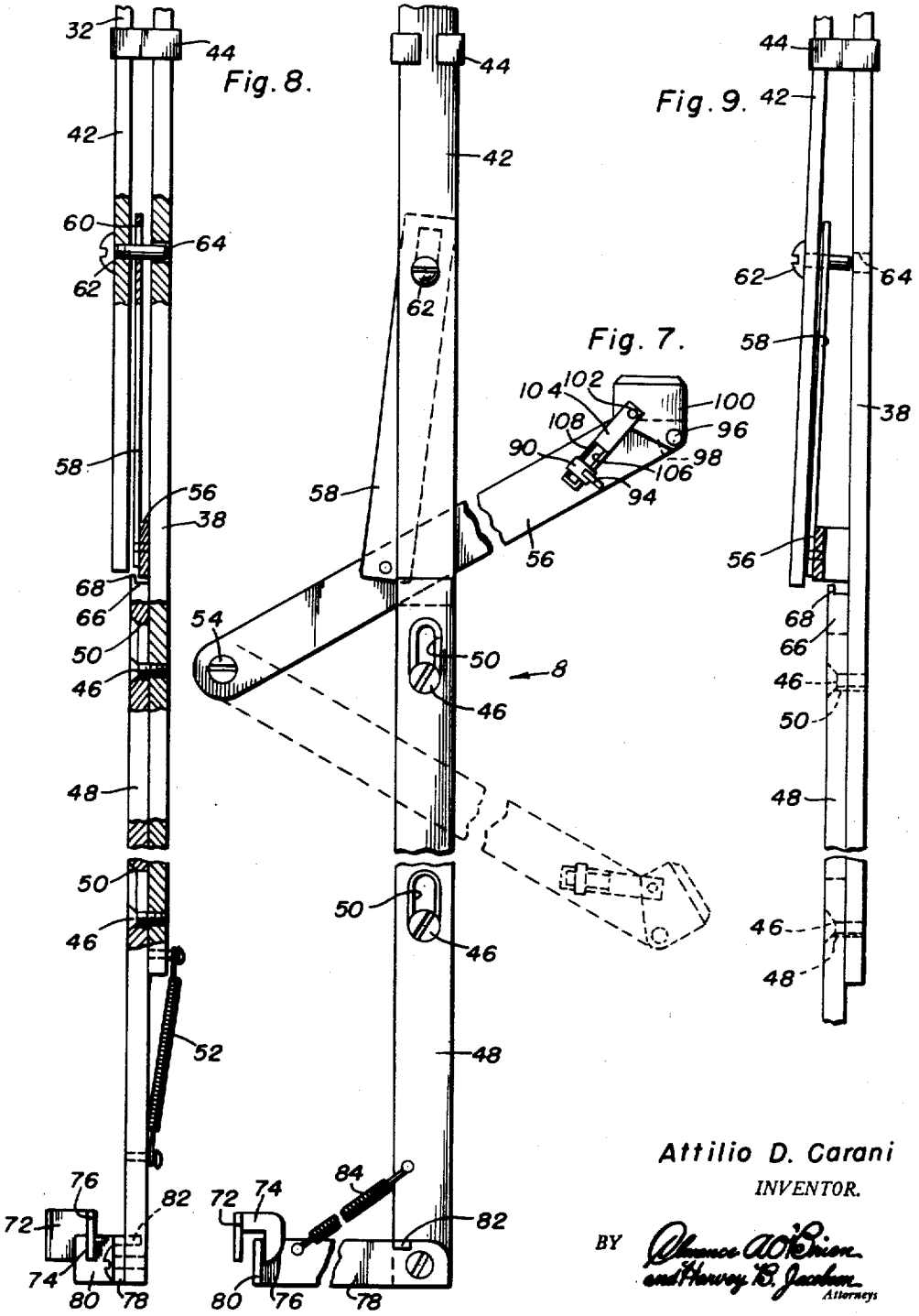
Attilio D. Carani
INVENTOR.
BY Clarence A. O'Brien and Harvey B. Jacobson
Attorneys

SEARCH ROOM

Reissued Dec. 5, 1950

Re. 23,301

UNITED STATES PATENT OFFICE 23,301

WINDOW STRUCTURE

Attilio D. Carani, Miami, Fla.

Original No. 2,479,602, dated August 23, 1949, Serial No. 41,440, July 30, 1948. Application for reissue December 30, 1949, Serial No. 136,100

9 Claims. (Cl. 20—53)

Matter enclosed in heavy brackets [ ] appears in the original patent but forms no part of this reissue specification; matter printed in italics indicates the additions made by reissue

This invention relates to new and useful improvements in window structures and the primary object of the present invention is to provide a plurality of hinged windows which are simultaneously raised to a selected open position and embodying novel and improved counterbalancing means whereby the windows will be retained in a selected raised position, [said means being responsive to an external pressure on a selected one of the windows from wind, rain or the like, for simultaneously closing all of said windows.]

Another important object of the present invention is to provide a window structure including a plurality of hinged windows and means for simultaneously locking said windows during the closing thereof.

Yet another object of the present invention is to provide a window structure including a plurality of hinged windows and a plurality of actuating bars which are lowered to adjustably open the windows, and novel and improved retaining means for holding said actuating bars in a selected lowered position.

Another feature of the present invention is to provide a window structure comprising a plurality of hinged windows including an upper window, and embodying means for simultaneously raising all of said windows to a selected open position or for opening said upper window independently of the remaining windows.

Another feature of the present invention is to provide a window structure including a plurality of hinged windows one of which is an upper window, a lower actuating bar connected to all of said windows except the upper window, an upper actuating bar connected to only said upper window, and novel and improved means detachably securing the upper actuating bar to the lower actuating bar whereby all of said windows may be raised simultaneously or said upper window may be raised when said remaining windows are closed.

Another important feature of the present invention is to provide a window structure including a plurality of windows and window raising mechanism, and novel and improved locking means associated with said raising mechanism and manually operable for retaining the windows in a selected raised and open position.

A further object of the present invention is to provide a window structure of the aforementioned character that is small and compact in structure and which is quickly and readily applied to or removed from a window frame or opening in a convenient manner.

A still further aim of the present invention is to provide a window structure that is simple and practical in construction, strong and reliable in use, neat and attractive in appearance, efficient and durable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a framentary rear elevational view of the present window structure, and showing the windows closed and locked;

Figure 5 is an enlarged, fragmentary, horizontal sectional view taken substantially on the plane of section line 5—5 of Figure 4;

Figure 6 is an enlarged, fragmentary, horizontal sectional view taken substantially on the plane of section line 6—6 of Figure 4;

Figure 7 is an enlarged, fragmentary, elevational view showing the manner in which the actuating bars are detachably secured to each other and the means for raising and locking the windows;

Figure 8 is a side elevational view of Figure 7 taken substantially in the direction of arrow numbered 8, and with parts broken away and shown in section;

Figure 9 is a view similar to Figure 8 and showing the upper actuating bar disengaged from the lower actuating bar;

Figure 1:
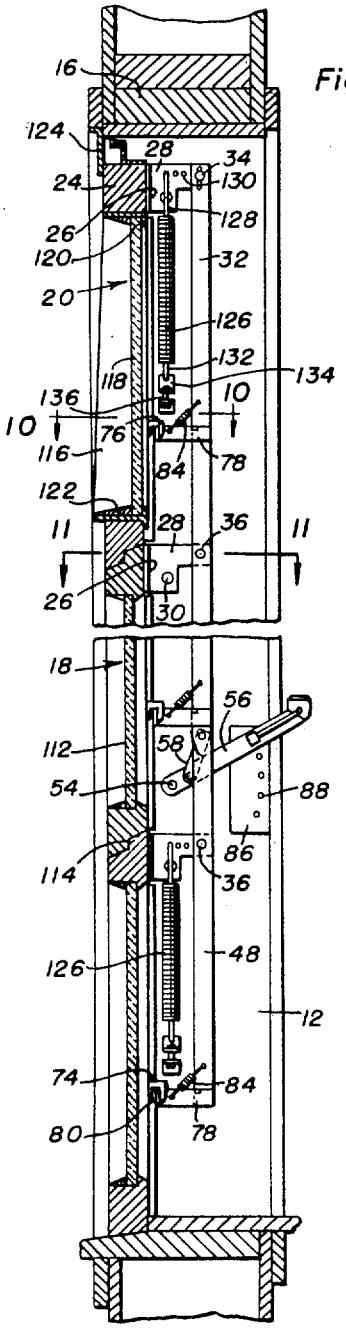
Figure 1 is a fragmentary, longitudinal vertical sectional view of the present window structure and showing the windows in a closed and locked position.

Referring now to the drawings in detail, wherein for the purpose of illustration there is disclosed a preferred embodiment of the present invention, the numeral 10 represents a substantially rectangular window frame including a pair of spaced, parallel, substantially vertical side members 12 and 14 which are suitably anchored or fixed to the sides of a window frame or casing 16.

The numeral 18 represents a plurality of vertically spaced windows generally, including an upper window 20. Secured by rivets, fasteners or the like 22, to the upper rails 24 of the windows 18 and 20 adjacent each end thereof, are angle members or plates 26 having reduced leg portions 28 which are spaced relative to the side members 12 and 14. Pivot pins 30 extend through the leg portions 28 of the angle members 26 and into the side members 12 and 14 for pivotal or hinge movement of the windows 18 and 20 relative to the side members 12 and 14.

An elongated, upper actuating member or bar 32 is pivoted and slidably secured at its upper end to a pin, rivet or the like 34 to the reduced leg portion 28 of the angle member 26 for the upper window 20, and longitudinally spaced pivot pins 36 secure a lower actuating member or bar 38 to the leg portions 28 of the angle members 26 for the remaining windows 18.

The upper actuating bar or section 32 is off-set, as at 40, to provide a lower portion 42 that is spaced parallel to the upper portion of the lower actuating bar 38 and a split, substantially rectangular guide 44 is secured to the upper portion of the actuating bar 38 and slidably receives the lower portion 42 of the upper actuating bar 32.

Slidably secured to one face of the lower actuating bar or section 38 by bolts or the like 46, is a further lower actuating bar or section 48. The bolts 46 are slidably received in longitudinally spaced, counter-sunken slots 50 provided in the further actuating bar 48, as shown best in Figures 7 and 8 of the drawings, to permit longitudinal sliding movement of the further actuating bar 48 relative to the actuating bar 38.

A resilient member or coil spring 52 is anchored at its end portions to the lower terminals of the bars 38 and 48 to normally urge the bar 38 downwardly with respect to the bar 48 and the fasteners 46 in the lower portions of the slots 50.

Pivoted as at 54 to the side member 12, is one end of an operating lever 56, the central portion of which is pivoted to the lower terminal of a pressure plate or strap 58. The upper end of the plate 58 is formed with a longitudinal slot 60 that slidably receives a holding pin 62 removably carried by the lower portion 42 of the upper actuating bar 32. This pin 62 normally engages an opening 64 formed in the upper portion of the bar 38 that projects upwardly from the upper end 66 of the further actuating bar 48, see Figures 7, 8 and 9, so that the bars 32 and 38 will move simultaneously.

The lower edge of the lever 56 normally bears against the upper edge 66 of the bar 48 so that as the lever 56 is forced downwardly, all of the bars 32, 38 and 48 will move downwardly, there being a slight initial movement of the bar 48 relative to the bar 38 before all of the said bars move together.

In order to move only the upper bar 32, the lever 56 is moved outwardly relative to the side member 12 until the lower edge thereof clears the dog or lip 68 on the upper end 66 of the bar 48 and the pin 62 disengages the opening 64. By then moving the lever 56 downwardly, the upper actuating bar 32 will move independently of the bars 38 and 48 to open only the upper window 20, as shown best in Figure 9 of the drawings.

Reference is next directed to the locking means for the windows 18 and 20 which is best illustrated in Figures 7 and 8.

Secured by any suitable means to side rails 70 of all of the windows 18 and 20, is the angulated end 72 of a hook member 74 having a cam surface 76.

The longer legs 78 of a plurality of substantially L-shaped members 80 are pivoted to the upper actuating bar 32 and the lower actuating bar 48 and the shorter legs of the L-shaped members 80 are adapted for locking engagement with the hook members 74.

Suitable stops 82 are carried by the long legs 78 of the L-shaped members 80 and limit the upward pivotal movement of the L-shaped members 80 relative to the bar 48.

Coil springs 84 connect the legs 78 of the L-shaped members 80 to the bar 48 and normally urge the L-shaped members to a horizontal position or in a position perpendicular to the bar 48.

When the windows 18 and 20 are pivoted to a closed position, the cam surfaces 76 bear against the shorter legs of the L-shaped members 80 to pivot the latter downwardly at which time the springs 84 will urge the L-shaped members 80 upwardly and the shorter leg thereof will be received by the hook members 74 (see Figure 7).

As the lever 56 is forced downwardly, the lower edge thereof will bear against the upper end 66 of the bar 48 to move the latter with respect to the bar 38 sufficiently to permit the L-shaped members 80 to disengage the hook members 74 before the windows are raised to an open position.

Attention is next directed to Figures 6 and 7, more particularly, wherein there is disclosed the means for locking the windows in a selected raised and open position.

An anchor plate 86 is removably secured to the side member 12 and is formed with a plurality of arcuately spaced openings 88. A locking pin 90 is slidably carried by the lever 56 and includes a head portion having a sloping surface 92. A suitable spring 94 mounted on the lever 56 normally urges a portion of the pin 90 from the lever 56 into a selected one of the openings 88.

Pivoted as at 96 to the reduced, free end portion 98 of the lever 56, is an angulated pressure plate 100 to which there is pivoted, as at 102, one end of slidable operating member 104 having a longitudinal slot 106 that receives the locking pin 90. Cams 108 are provided on the member 104, adjacent the slot 106, and bear against the sloping surface 92 of the pin 90.

When the pressure plate 100 is pushed downwardly, the member 104 will move toward the pin 90 and the cams 108 will force the pin 90 out of engagement with a selected one of the openings 88 in the plate 86 whereby the bars 32, 38 and 48 will be free to move upwardly and the windows 18 and 20 may be pivoted to a closed and locked position.

The windows 18 each includes a substantially rectangular frame 110 that supports a pane of glass or such other transparent or translucent material 112 and the adjacent rails of adjacent windows 18 are oppositely rabbeted or notched as at 114 so that the lower portion of one window will engage the upper portion of an adjacent window, see Figure 1, whereby the outer and inner faces of the engaged rails will be coplanar and the space between windows sealed to prevent rain, snow or the like from passing between the same.

SEARCH ROOM

The upper window 20 is constructed slightly different than the windows 18 and includes an inner substantially rectangular frame 116 the upper wall of which is slightly reduced in width than the lower wall so that the same will form a liquid retaining means together with the pane 118 which bears against an inturned flange 120 at the inner end of the frame 116.

The pane 118 is held relative to the frame 116 by putty or the like 122, and the frame 118 is detachably secured to the frame of the upper window 20 by any suitable means. The lower rail of the frame for the upper window 20 is appropriately notched or rabbeted to engage the upper rabbeted rail of the window 18 adjacent the window 20, and a sealing plate 124 depending from the window frame 10 bears against and seals the space between the upper portion of the window 20 and the top member for the frame 10.

In order to cushion the closing movement of the windows 18 and 20, and to permit selective raising of the windows 18 and 20, there is provided a plurality of resilient members or coil springs 126 there being at least one for each window.

Figure 2:
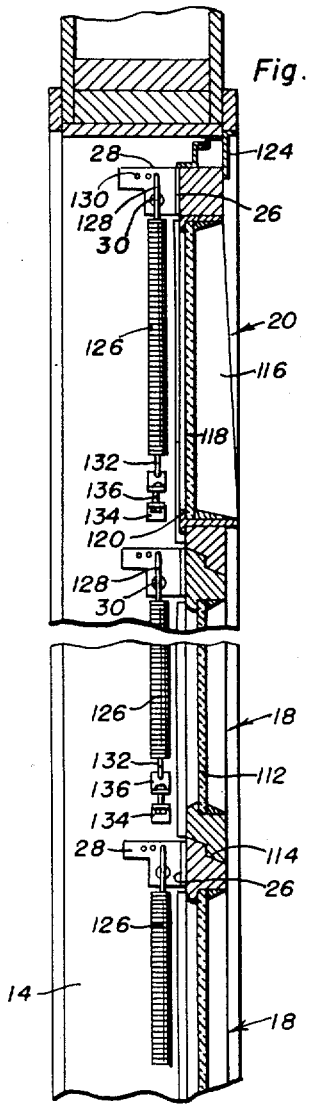
Figure 2 is a fragmentary, longitudinal vertical sectional view of the present window structure taken in the opposite direction from Figure 1, and showing the windows closed.

The upper hook terminals 128 of the springs 126 engage a selected one of a plurality of apertures 130 provided in the legs 28 of the angle members 26 adjacent the side members 12 and 14, and the lower ends 132 of the springs 126 are adjustably secured to brackets 134 fixed to the side members 12 and 14 by bolts and nuts 136 (see Figures 1 and 2). It should be noted, that the resilient member for the window 18 adjacent the operating lever 56 is removed to prevent the same from restricting the pivotal movement of the lever 56.

A vertically disposed sealing strip 138 is fixed to each side member 12 and 14 and seals the sides of the windows 18 and 20 when the latter are closed and locked, and the strips 138 are notched as at 140 to permit the pivotal movement of the members 26 and the legs 28 thereof.

In order to seal the openings or notches 140, longitudinal strips 142 are secured to the sides of the windows 18 and 20 and the free edges thereof bear against the side members 12 and 14 when the windows are pivoted to a closed position.

It should be noted, that the primary feature of the present invention is to provide a window structure wherein the windows may be quickly and readily opened to a predetermined position without effecting appreciable effort. Such being the case, the resilient members 126 normally align, vertically, the pivot pins 30 when the windows are closed. As the actuating bars are pressed downwardly, the weight of the actuating bars together with the weight of the inner portions of the brackets 26 and the spring members 126 are in perfect balance with the windows, and the portion of the brackets 26 mounted on the window, and the windows will remain open at the position where the actuating bars are released.

The balance of the windows is such that when rain (or an external pressure upon the window) collects in the retaining frame 116 of the upper window, the weight of the windows plus the rain (or external pressure on the upper window), overcomes the counter-balancing action of the members 126 and the actuating bars, and the windows will be urged to a lowered and closed position.

In order to lock the windows in a selected raised position, the pin 90 is engaged in a selected aperture 88 in the angle plate 86 whereupon it will be necessary to manually disengage the locking pin in order to effect a closing of the windows.

Although there is shown in the drawings a locking mechanism (74 and 80) for the upper window 20, it is apparent that when the pin 62 is engaged in the aperture 64, the lower windows being locked, it is not possible for the upper window to be opened from a position outwardly thereof; therefore, the locking mechanism for the upper window is merely a safety precaution and need not be employed. However, when the window is raised independently of the lower windows, the pin 62 being disengaged from the opening 64, it is preferred that a locking mechanism for the upper window be used in order to assure an automatic locking action of the upper window.

Figure 3:
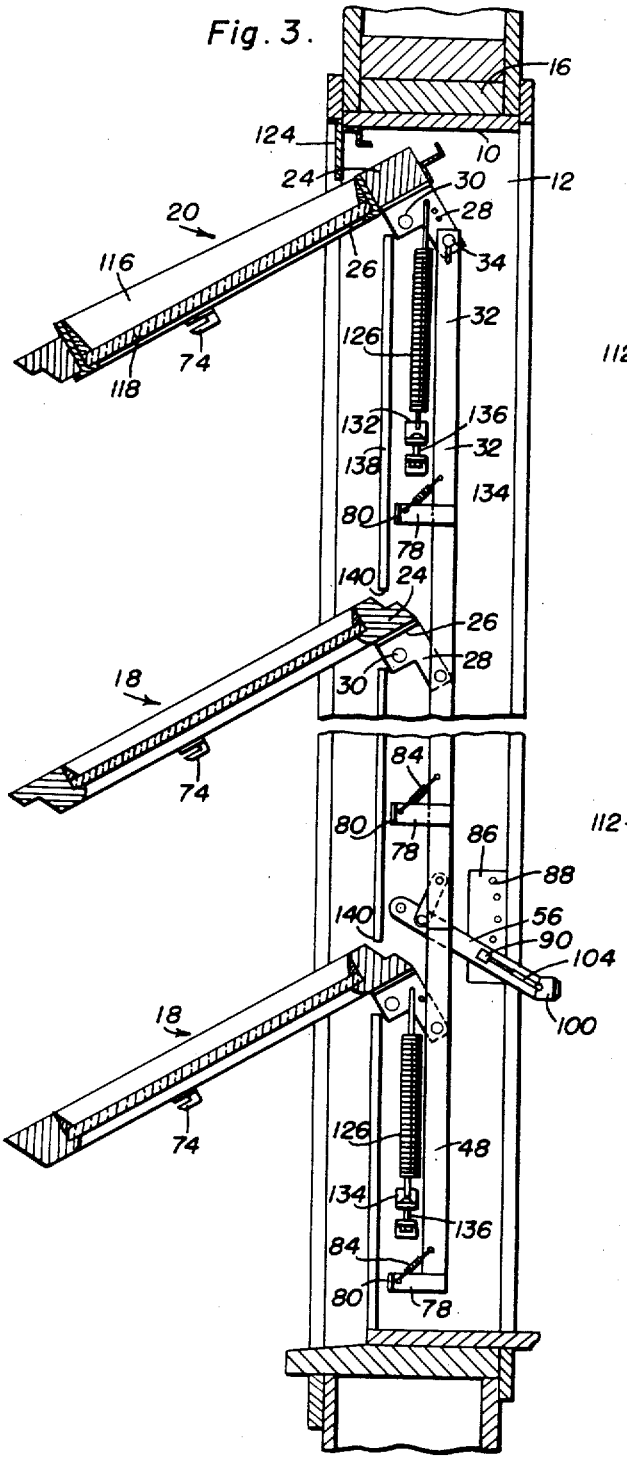
Figure 3 is a view similar to Figure 1, and showing all windows in an open position.
Figure 10:
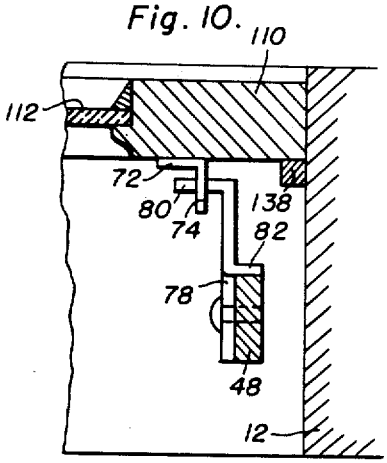
Figure 10 is an enlarged sectional view taken substantially on the plane of broken section line 10—10 of Figure 1.
Figure 11:
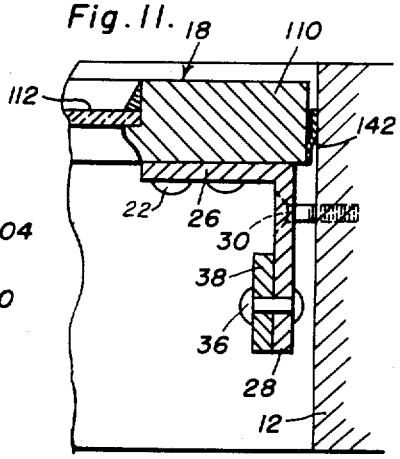
Figure 11 is an enlarged horizontal sectional view taken substantially on the plane of section line 11—11 of Figure 1.

As illustrated in Figure 3 of the drawings, the central window is not provided with a resilient member 126 since the same is not necessary due to the adjustability and design of the resilient members for all of the windows. Brackets 26 are formed with a plurality of apertures in order to accommodate the upper hook terminals of the spring members 126 so that in some instances, when the weight of the windows is extremely large due to the material used therefor, the resilient members 126 may be placed in order to obtain the proper counter-balancing action.

Due to the adjustability of the pivot pins, fasteners or bolts, it is apparent that the windows may be adjusted between the side frames 12 and 14 in order to accommodate any swelling absorbtion of moisture effecting the windows which are normally constructed of a fibrous material.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A window structure comprising a frame, a plurality of windows hinged to said frame for outward swinging movement relative to said frame and including an upper window and a plurality of lower windows, upper and lower actuating bars slidably secured to said frame, means pivotally securing said upper actuating bar to said upper window, means pivotally securing said lower windows to said lower actuating bar, a lever pivoted to said frame, means carried by one of said actuating bars securing said actuating bars together whereby said upper actuating bar may be lowered independently of said lower actuating bar, means actuated by said lever for detaching the actuating bars from each other and forming a connection between said lever and said means securing said actuating bars together, counter-balancing means forming a connection between the windows and the frame and retaining said actuating bars in a selected lowered position, and liquid retaining means carried by said upper window for receiving a predetermined quantity of liquid, said counter-balancing means being responsive to an external pressure on said upper window from liquid disposed in said liquid retaining means for overcoming the counter-balancing action and urging all of said windows to a closed position.

2. The combination of claim 1 wherein said means detachably securing said actuating bars together includes a pin carried by and projecting laterally from said upper actuating bar, said lower, actuating bar having an opening therein receiving said pin.

3. The combination of claim 1 wherein said means actuated by said lever for detaching the actuating bars from each other includes an elongated strap having upper and lower end portions, the lower end portion of said strap being pivoted to said lever, the upper end portion of said strap receiving said means detachably securing said actuating bars together.

4. The combination of claim 1 wherein said counter-balancing means includes a plurality of coil springs having upper and lower ends, means securing the upper ends of said coil springs to said windows and a further means securing the lower ends of said coil springs to said frame.

5. A window structure comprising a frame, a plurality of windows hinged to said frame for outward swinging movement relative to the frame and including an upper window and a plurality of lower windows, upper and lower actuating bars slidably secured to said frame, means pivotally securing said upper actuating bar to said upper window, means pivotally securing said lower windows to said lower actuating bar, a lever pivoted to said frame, means carried by one of said actuating bars for securing said actuating bars together whereby said upper actuating bar may be lowered independently of said lower actuating bar, means actuated by said lever for detaching the actuating bars from each other and forming a connection between said lever and said means securing said actuating bars together, counter-balancing means connecting the windows to the frame and retaining said actuating bars in a selected lowered position, liquid retaining means carried by said upper window for receiving a predetermined quantity of liquid, said counter-balancing means being responsive to an external pressure on said upper window from liquid disposed in said liquid retaining means for overcoming the counter-balancing action and urging all of said windows to a closed position, and complemental locking members carried by said actuating bars and said windows for simultaneously locking all of said windows during the lowering thereof.

6. The combination of claim 5 wherein complemental locking members include a first plurality of hooks carried by said windows, a second plurality of hooks pivoted on said actuating bars for downward swinging movement, means normally retaining said second plurality of hooks perpendicular to said actuating bars, cam surfaces on each of said first plurality of hooks for riding against and pivoting said second plurality of hooks downwardly during the closing of said windows whereby said second plurality of hooks will be urged to their normal position for locking engagement with said first plurality of hooks.

7. A window structure comprising a frame, a plurality of windows mounted on said frame for outward swinging movement and including an upper window and a group of lower windows, a plurality of angle brackets having first and second leg portions, the first leg portions of said angle brackets being fixed to said plurality of windows, pivot pins securing the second leg portions of said angle brackets to said frame, elongated spring members securing the second leg portions of said angle brackets to said frame, said spring members being in vertical alignment with said pivot pins when said plurality of windows are in a closed position, unitary acting actuating members slidably mounted on said frame and pivoted to the second leg portions of said angle brackets, a lever pivoted to the frame and connected to one of the actuating members for moving the actuating members to open said plurality of windows, the turning moment of the spring members being in balance with the turning moment of the windows about the pivot pins to retain the windows in a selected raised position, and a liquid receiving means carried by said upper window for receiving rain to overcome the balance between turning moment of the spring members and the turning moment of the windows about the pivot pins and thereby effect a closing of the plurality of windows.

*8. A window structure comprising a frame, a plurality of windows mounted on said frame for outward swinging movement, a plurality of angle brackets having first and second leg portions, the first leg portions of each of said angle brackets being fixed to said windows, pivot pins securing the second leg portions of said angle brackets to said frame, elongated spring members each secured at one end to said frame, each of said second leg portions having means connecting the other end of one of said springs thereto, said means being so located that said spring members are substantially in vertical alignment with said pivot pins when said windows are in a closed position and are out of said vertical alignment in a direction away from said first leg portions when the windows are in open positions, an actuating member pivoted to the second leg portions of said angle brackets at a position thereon removed from said pivot pins in a direction away from said first leg portions, said actuating member being slidably mounted relative to said frame, a lever pivoted to the frame and connected to said actuating member for moving the actuating member to open said windows, the distance of each pivot pin from its respective window relative to its distance from its respective spring being such that the turning moment of the spring members are in balance with the turning moment of the windows about the pivot pins so as to retain the windows in a selected opened position.*

*9. A window structure comprising a frame, a window mounted on said frame for outward swinging movement, an angle bracket having first and second leg portions, the first leg portion of said angle bracket being fixed to said window, a pivot pin securing the second leg portion of said angle bracket to said frame, an elongated spring member secured at one end to said frame, said second leg portion having means connecting the other end of said spring thereto, said means being so located that said spring member is substantially in vertical alignment with said pivot pin when said window is in a closed position and is out of said vertical alignment in a direction away from said first leg portion when the window is in an open position, an actuating member for opening and closing said window secured to the second leg portion of said angle bracket at a position thereon removed from said pivot pin in a direction away from said first leg portion, the distance of said pivot pin from said window rela-*

SEARCH ROOM

*tive to its distance from said spring being such that the turning moment of the spring member is in balance with the turning moment of the window about said pivot pin so as to retain said window in a selected opened position.*

ATTILIO D. CARANI.

REFERENCES CITED

The following references are of record in the file of this patent or the original patent:

UNITED STATES PATENTS

| Number | Name | Date |
|---|---|---|
| 474,720 | Brennan | May 10, 1892 |
| 687,705 | Walker | Nov. 26, 1901 |
| 1,609,219 | Stowers | Nov. 30, 1926 |
| 1,763,838 | Vernet | June 17, 1930 |
| 1,934,337 | Swanson | Nov. 7, 1933 |
| 1,949,793 | Ing | Mar. 6, 1934 |
| 1,959,941 | Wiley | May 22, 1934 |
| 2,137,426 | Thompson | Nov. 22, 1938 |
| 2,252,634 | Justason | Aug. 12, 1941 |